T. HUMPAGE.
POWER HACKSAW.
APPLICATION FILED JAN. 18, 1913.
1,146,572.
Patented July 13, 1915.
2 SHEETS—SHEET 1.
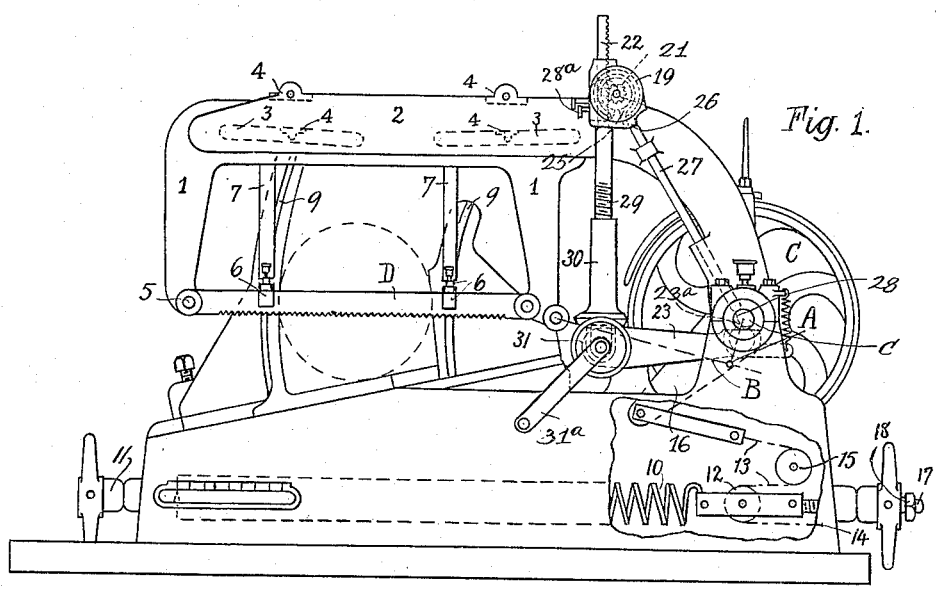
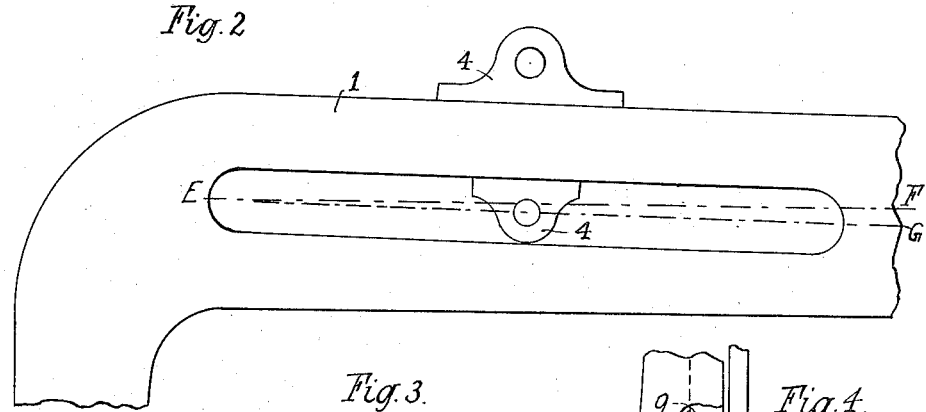
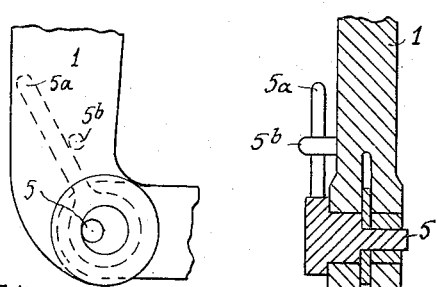
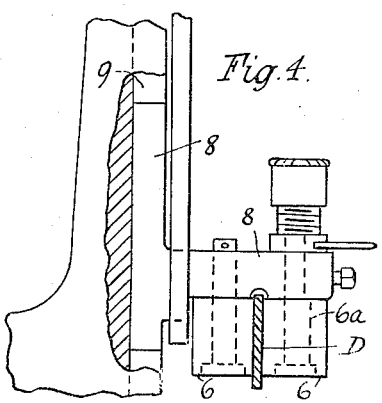
Witnesses:
Inventor:
Thomas Humpage
By J. W. Horschel
Atty.

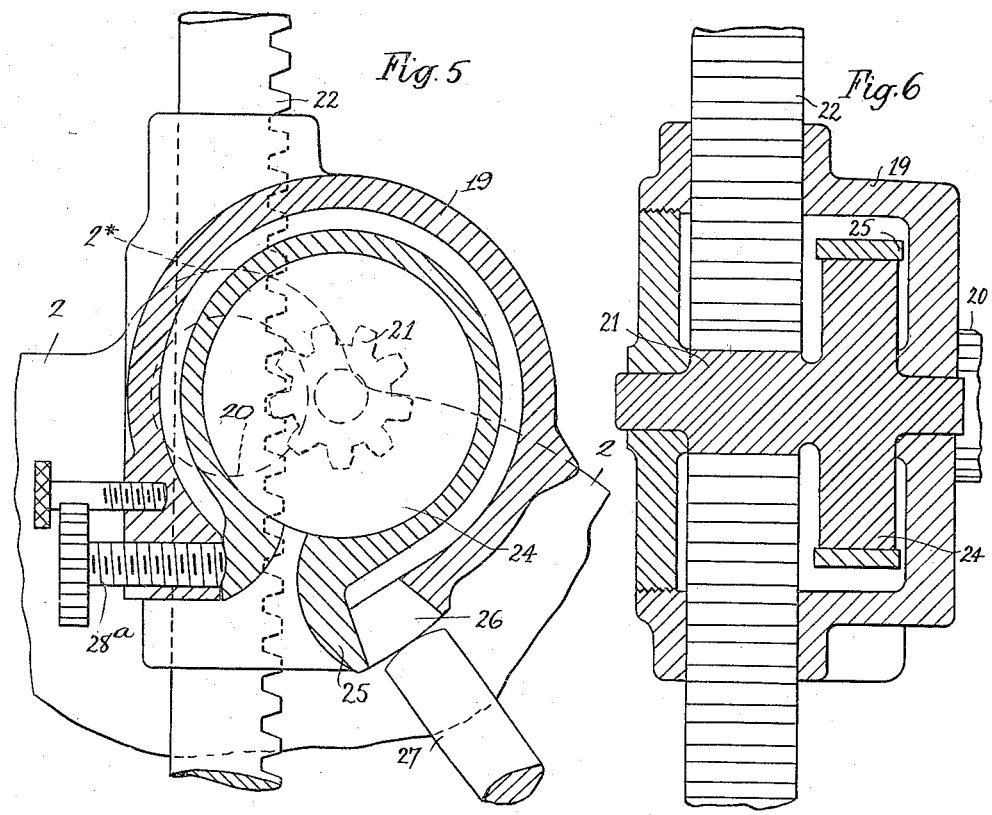
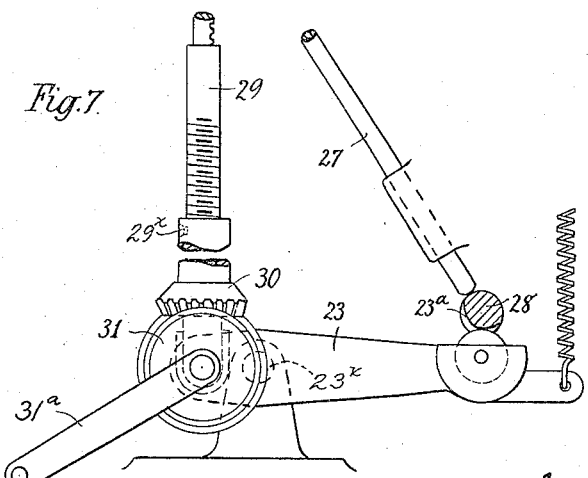

UNITED STATES PATENT OFFICE.

THOMAS HUMPAGE, OF BRISTOL, ENGLAND.

POWER-HACKSAW.

1,146,572.  Specification of Letters Patent. Patented July 13, 1915.

Application filed January 18, 1913. Serial No. 742,919.

*To all whom it may concern:*

Be it known that I, THOMAS HUMPAGE, a subject of the King of England, residing at Bristol, in the county of Gloucestershire, in the Kingdom of England, have invented a new and useful Improvement in Power-Hacksaws, of which the following is a specification.

This invention relates to improvements in power hacksaws for cutting off bars of steel or other metals.

Referring to the accompanying illustrations: Figure 1 represents the power hacksaw in side elevation with a portion of the bed cut away to show the internal mechanism; Fig. 2 represents one end of the saw frame or bow in elevation and Fig. 3 is a section taken through the pin which holds the saw at this end of the frame; Fig. 4 represents one of the roller steadies; Figs. 5, 6 and 7 represent the mechanism by means of which the saw is caused to lift off the work on the return stroke; Fig. 7 being an enlarged portion of Fig. 1.

The saw blade is secured in a bow or in a frame (1) to which a reciprocating motion is given by means of a crank and connecting rod, in the usual way, said crank and connecting rod being indicated by the lines A and B respectively. The saw frame is carried by an arm (2) of channel section, which is free to move about the same center C as the crank shaft.

The saw frame is provided with two slides (3) and these together with slide blocks (4) attached to the channel arm (2) form a guide for the bow or frame 1. Hitherto such slides in hack-saws have been made parallel to the saw blade D, but in this invention the two slides are inclined to one another, their center lines forming an angle whose apex points toward the saw. In Fig. 2 the horizontal line is shown E F and the center line of the slide is E G. Thus, when a reciprocating motion is given to the saw frame, the inclined guides cause the saw to rock slightly. By this means fewer teeth of the saw are actually cutting at any given time. Thus the whole pressure is concentrated on a few teeth and it is found that the saw will cut faster than is the case when the slides are made parallel to the saw blade and the same pressure distributed over a greater number of teeth.

The saw blade D is provided with a hole at each end in the usual way, the distance between these holes being an exact measurement. A bolt passes through one of these holes and fixes the blade to one end of the saw frame. The other end of the saw frame is provided with a socket which carries a crank pin (5) which is capable of being turned by a lever (5ª). When the crank pin is turned so that its throw is inward it will pass freely through the hole at the corresponding end of the saw blade. The crank is then given a half turn, the lever (5ª) coming in contact with stop pin (5ᵇ) and its throw gives the correct tension to the saw blade.

Two pairs of roller steadies (6) are attached at various points to the channel arm 2 by means of hangers 7. These are adjusted along the arm so that one is on each side of the bar that is to be sawn off and as near to it as possible. Each steady consists of a pair of rollers which can be adjusted to touch the saw blade one on each side by an eccentric pin (6ª). Thus any tendency which the saw blade may have to deviate from a true vertical plane is prevented. The front roller steady is carried on a block (8) provided with a dovetailed projection which slides in an arcuate groove (9) milled in the side of the front vise-jaw holding the bar. The said arcuate groove is true to the center of the main crank-shaft. The back roller steady is carried on a similar block, similarly guided in the back jaw of the vise. These guides prevent any tendency which the saw blade may have to move bodily to one side or the other and insure the bar being cut off in a true vertical plane. Instead of the usual dead weight a spring (10) is carried in the bed of the machine, to which it is attached at one end by means of a screw (11). By turning this screw the amount of tension that is given to the spring can be varied. The other end of the spring is attached to a pulley (12). One end of a chain (13) is anchored to the bed of the machine (14) and after passing over the said pulley (12) and around another pulley (15), which is free to rotate on a spindle fixed in the bed, the other end of the chain is attached to a lever (16) forming part of the channel arm. As the saw cuts through the bar the channel arm descends and the tension of the spring decreases. At the same time the leverage at which the spring acts increases. The position of this lever is so designed with regard to the spring that the increased leverage compensates for the decrease in tension of the spring and the pressure on the saw keeps practically constant.

The pulley (12) around which the chain passes is carried on a rod. This rod (17) projects through the end of the bed of the machine and as the channel arm descends the rod is drawn inside the bed. The end of the rod (17) is screwed and a nut (18) is provided which prevents the rod from being drawn in beyond a certain point. This nut is adjusted to stop the rod at a point when the saw is nearly through the work. As the saw continues to cut beyond this point the channel arm continues to descend and the cut takes up all the spring pressure allowing the chain to become slack. Thus the saw is relieved of all the pressure except the dead weight of the channel arm and saw frame when finishing the cut. Attached to the channel arm is a gear case (19) capable of oscillating about an eccentric trunnion (20) journaled in an eye 2* of the arm 2, and in the said case is a pinion (21) which engages with a rack (22) cut on a vertical rod. The lower end of the rack rod rests on the short arm of a two-armed lever 23 pivoted at 23ˣ and oscillated by a cam (23ª) cut in the crank shaft. A brake drum (24) is attached to the pinion (21) and a band brake (25) is provided to surround the brake drum. Bearing against the free end of the band brake is a wedge (26) the outside of which is truly concentric with the trunnion (20) on which the gear case 19 oscillates. Bearing on this concentric surface is a rod (27) which is also caused to move up and down by means of a second cam (28) on the crank shaft. When the band brake is released by the wedge (26) the pinion (21) is free to turn and the channel arm and saw frame can be moved up or down, but when the second rod (27) presses on the wedge (26) and causes the band brake (25) to grip the drum (24), the pinion (21) is locked and compelled to move with the rack.

The cams 23ª and 28 are so timed that during the cutting stroke the brake drum and pinion are free and the channel arm carrying the frame and saw is therefore free to descend. On the return stroke of the saw, the pinion 21 is locked by the band brake 25 and the rod 22 is held fast in the case 19 pivoted to the arm 2 so that the lever 23 lifts the arm, thus causing the saw to lift automatically off the cut. To compensate for wear the fixed end of the band brake can be adjusted by means of a screw (28ª) through the gear case.

Surrounding the lower end of the vertical rod on which the rack (22) is cut is a sleeve (29) in which the rod can slide up or down, but which sleeve is prevented from turning by means of a dowel 29ˣ. This sleeve (29) is screwed externally. A miter wheel (30) is provided with a long boss screwed internally to fit the sleeve. A second miter wheel (31) gears with the first and can be turned by means of a handle (31ª). By turning this handle the sleeve is raised or lowered and so made to bear against the under side of the oscillating gear case (19) when required. Thus the channel arm carrying the saw frame can be raised for lifting the saw above the workpiece, then lowered to the full descent of the saw, or it can be sustained in any desired position so as to suit the bar being cut and to withdraw the saw at the finish of the cutting operation.

I am aware that prior to my invention hanging saws in saw-mills for cutting wood have been provided with extraneous means to produce a swinging motion during their vertical descent and I do not claim such a combination; I merely utilize and re-arrange the known guiding means forming part of a horizontally moving hack-saw for cutting metal-bars in such a manner as to bring a small number of teeth into operation at different cutting angles from those of the remaining teeth of the saw.

I claim:—

1. In a power hack-saw the combination with a horizontal base and a superposed horizontal arm pivoted to the base, of a hack-saw and bow mounted in said arm so as to have a positive reciprocatory rocking motion substantially in a horizontal plane, means for operating the saw, and means pivoted on said arm for lifting same during each return stroke of the saw.

2. In a power hack-saw as described the combination with the saw blade, of two pairs of adjustable roller steadies for said saw, blocks with dovetailed projections connected with said steadies, and vise-jaws with arcuate grooves to receive said blocks, as and for the purpose stated.

3. In a power hack-saw as described, the combination with a hollow base, a channel arm pivoted to the base, a hack-saw carried by said arm, and means for operating the saw, of a lever, with increasing leverage during the descent of the saw, connected with said arm, and a spring connected with the base and said lever respectively to cause the latter to compensate by increase of leverage the decrease of tension of the spring, as stated.

4. In a power hack-saw as described, the combination with a hollow base, a channel arm pivoted to the base, a hack-saw carried by said arm, and means for operating the saw, of a lever connected with the channel-arm, a chain fast to the lever and the base respectively, guide pulleys for the chain, a pulley-block connected with one of the guide pulleys, a tension spring attached to the pulley-block and to the base respectively, and adjustable means for limiting the stroke of the pulley-block to relieve the saw of spring-pressure, as stated.

5. In a power hack-saw the combination with a hollow base, an arm pivoted to said base, a hack-saw carried by the arm, and means for operating the saw, of means for bodily lifting the saw at the return stroke which consist of a gear case oscillating about a trunnion journaled in said pivoted arm, a pinion in such gear case, a rack-rod meshing said pinion, a lever for reciprocating the rack-rod, a cam on the power shaft for operating said lever, a brake drum fast to said pinion, a brake-band on the drum, a second reciprocating rod for tightening the brake, a second cam on the power shaft to actuate said reciprocating rod, as and for the purpose stated.

6. In a power hack-saw the combination with a hollow base, a channel-arm, pivoted to said base, a hack-saw carried by said arm, means for pushing and rocking said saw at the forward stroke, means for bodily lifting the saw at the return stroke, and a gear case journaled on said channel-arm, of a sleeve to bear against the underside of the gear case, means for raising and lowering and sustaining said sleeve, gear case and channel-arm, as and for the purpose stated.

THOMAS HUMPAGE.

Witnesses:
G. A. THOMPSON,
E. J. FUSSELL.

Copies of this patent may be obtained for five cents each, by addressing the "Commissioner of Patents. Washington, D. C."